May 12, 1964     G. D. STOUGH     3,132,603
BUMPER STRUT TYPE RACK STRUCTURE
Filed June 19, 1961     5 Sheets-Sheet 4

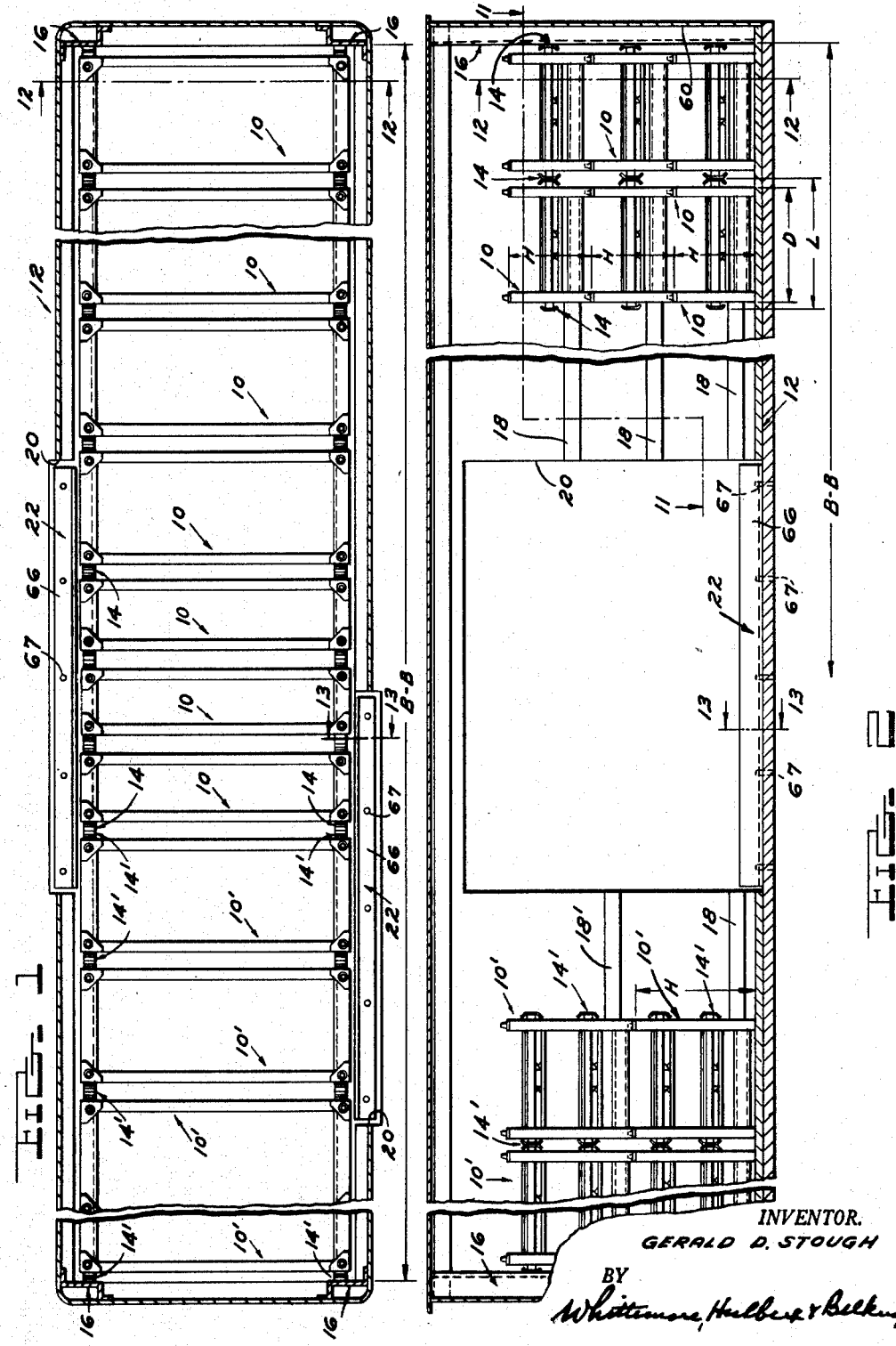

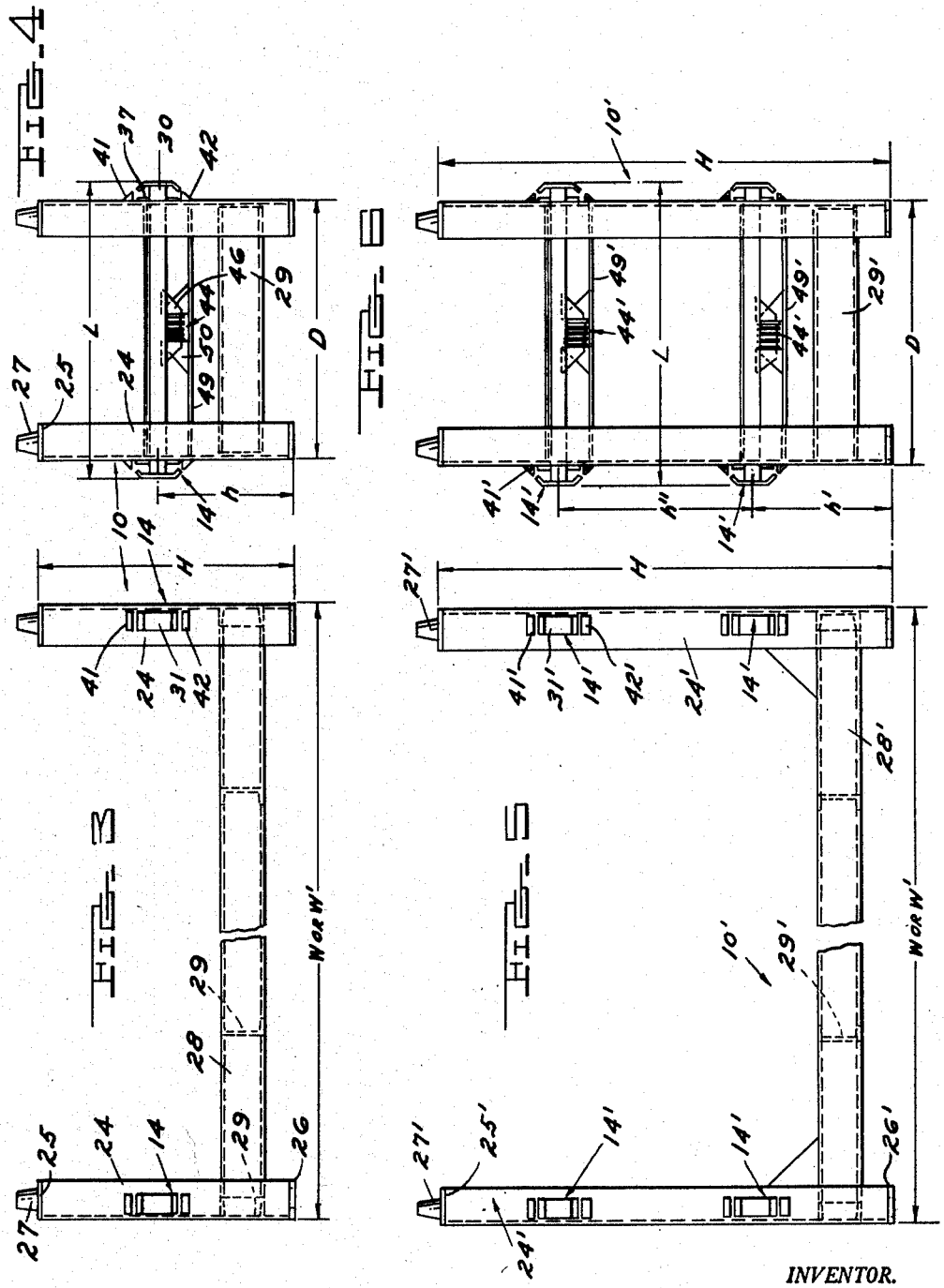

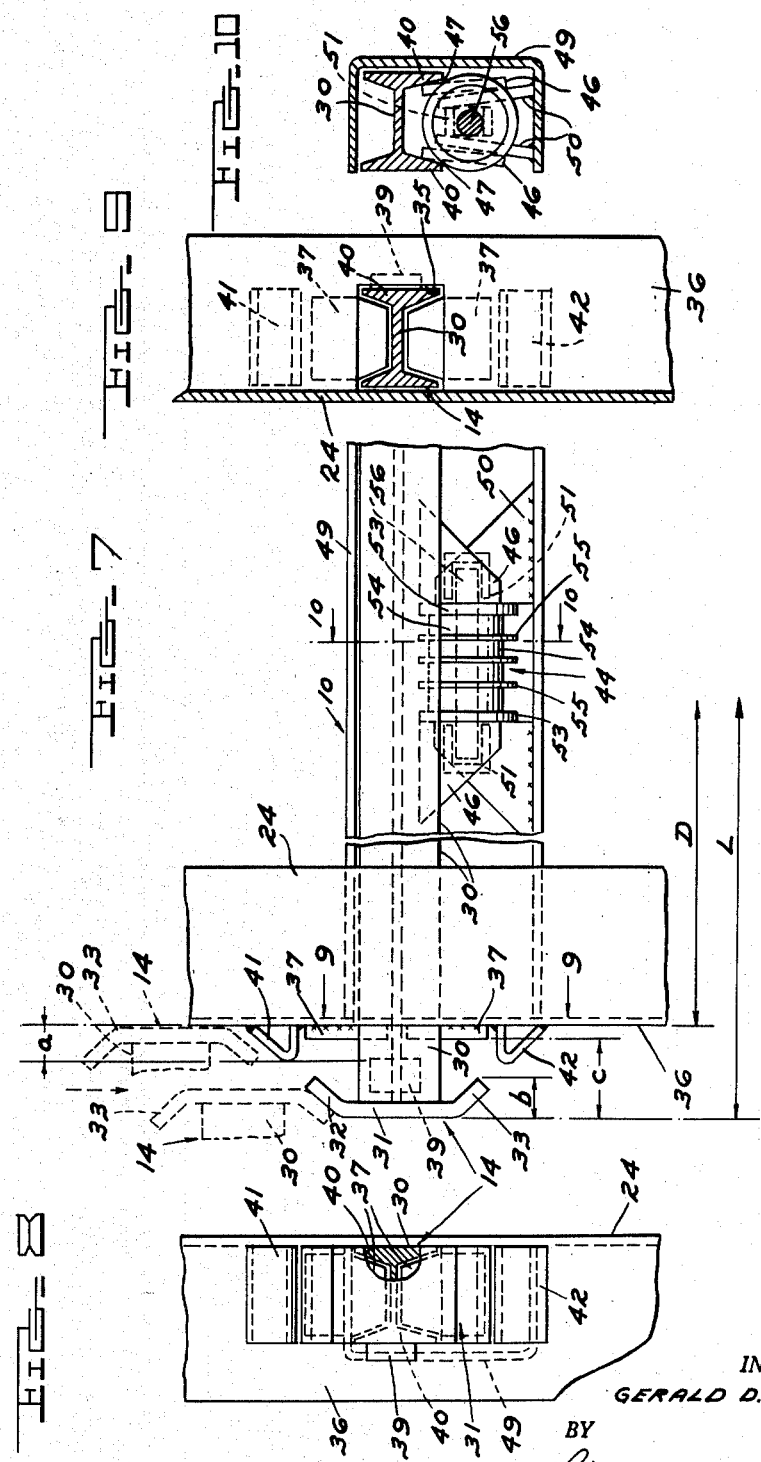

INVENTOR.
GERALD D. STOUGH
BY
Whittemore, Hulbert & Belknap
ATTORNEYS

May 12, 1964

G. D. STOUGH 3,132,603

BUMPER STRUT TYPE RACK STRUCTURE

Filed June 19, 1961

INVENTOR.
GERALD D. STOUGH
BY
Whittemore, Hulbert & Belknap
ATTORNEYS

United States Patent Office
3,132,603
Patented May 12, 1964

3,132,603
BUMPER STRUT TYPE RACK STRUCTURE
Gerald D. Stough, Detroit, Mich., assignor to Whitehead & Kales Company, River Rouge, Mich., a corporation of Michigan
Filed June 19, 1961, Ser. No. 118,144
5 Claims. (Cl. 105—369)

The present invention relates generally to the loading of portable merchandise carrying racks within transport vehicles, and refers particularly to bumper strut type rack structure for use in such loading.

A general object of the invention is to provide bumper strut rack structure, wherein merchandise carrying racks are equipped with longitudinal bumper struts which engage one another longitudinally of the struts and of the transport vehicle; and wherein these bumper struts bear a predetermined relation in point of individual length to the effective overall length of the vehicle interior.

Another object of the invention is to provide bumper strut rack structure involving an arrangement of racks having individual corresponding bumper struts in longitudinal alignment with one another and extending lengthwise of the transport vehicle to constitute an elongated sectional column which also extends lengthwise of the vehicle. Such longitudinal column is of a length closely approximating the longitudinal distance between fixed bumper abutment or bulkhead members built into the transport vehicle at opposite ends thereof, and with which members the endmost bumpers are adapted to engage with but slight longitudinal clearance. Thus there is provided a vehicle loading arrangement enabling the racks to be expeditiously placed in position in the vehicle, as by fork truck equipment, leaving the columnized bumper struts of the loaded racks the sole means to limit movement of the racks longitudinally of the vehicle interior, and to absorb endwise shock incident to the motion of the vehicle.

Another object of the invention is to provide bumper strut rack structure, wherein the racks and struts carried thereby are provided with means adjacent the ends of the struts to facilitate loading in the transport vehicle, without entangling or fouling a rack being loaded with the next adjacent rack.

Another object of the invention is to provide bumper strut rack structure wherein, after the racks are loaded, the construction and arrangement of the struts and racks are such that relative movement as between the struts is substantially prevented, while permitting movement of the racks relative to the struts.

Another object of the invention is to provide bumper strut rack structure, wherein suitable shock absorbing means is provided between each rack and the struts carried thereby to enable shock load imparted to each rack to be absorbed when subjected to movement lengthwise of the transport vehicle.

Another object is to provide bumper strut rack structure, wherein the rack and bumper strut have positive stop means to limit movement of the rack relative to the bumper strut, lengthwise of the latter.

Another object is to provide bumper strut rack structure, wherein suitable means are provided for the guiding of each strut in the relative movement of the strut and its supporting rack.

The foregoing as well as other objects will become more apparent as this description proceeds, especially when considered in connection with the accompanying drawings illustrating preferred embodiments of the invention, wherein:

FIG. 1 is a view, partially broken away, in horizontal cross section through a transport vehicle, typically shown as a railroad box car, illustrating an arrangement of loaded, bumper-like racks according to the invention in the vehicle, in the manner contemplated by the invention;

FIG. 2 is a fragmentary view, partially broken away and in vertical longitudinal cross section through the vehicle, further illustrating the contemplated loaded arrangement of racks to occupy the entire longitudinal interior space of the vehicle, in accordance with the invention;

FIG. 3 is a view in side elevation, partially broken away, of one of the improved bumper-equipped load racks of the invention;

FIG. 4 is an end elevation of the rack;

Figure 11:
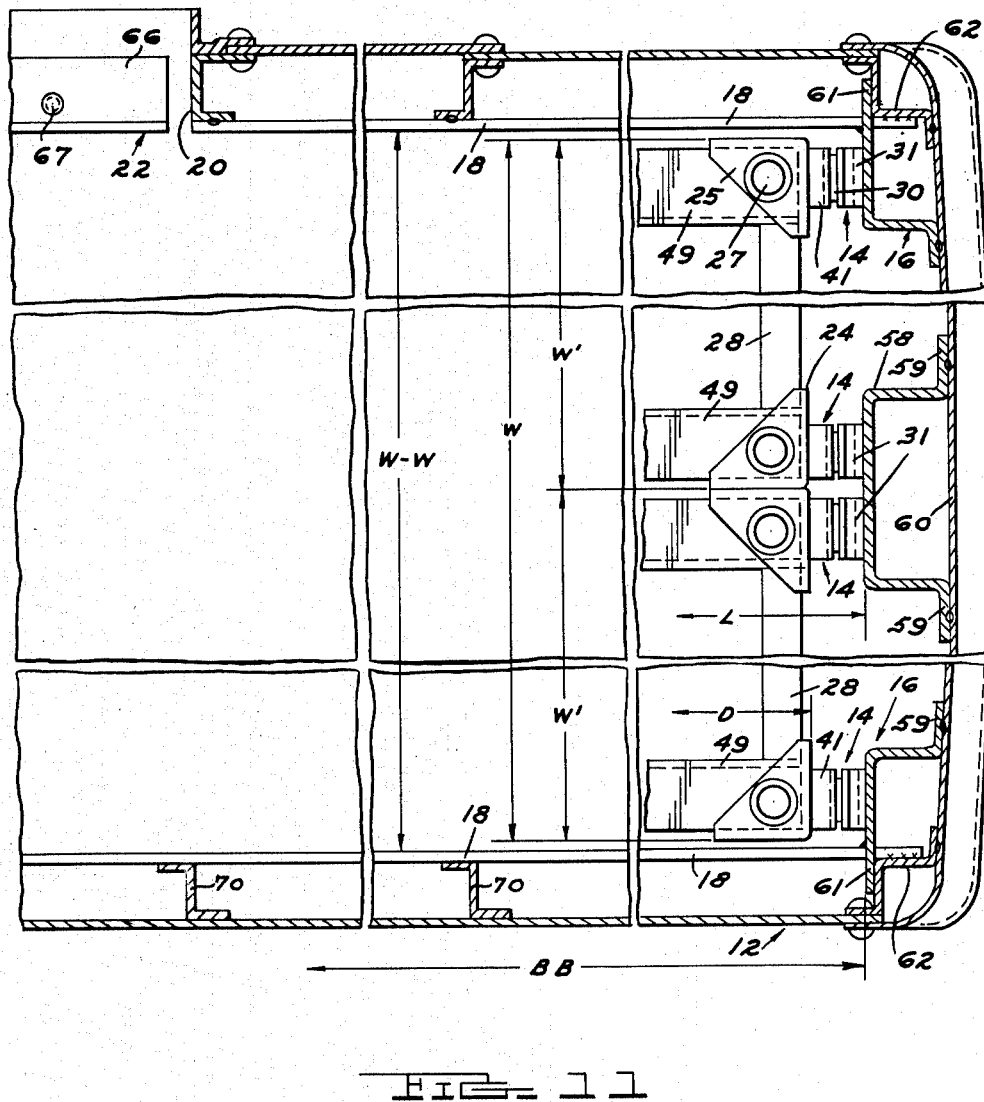
Figures 12, 13:
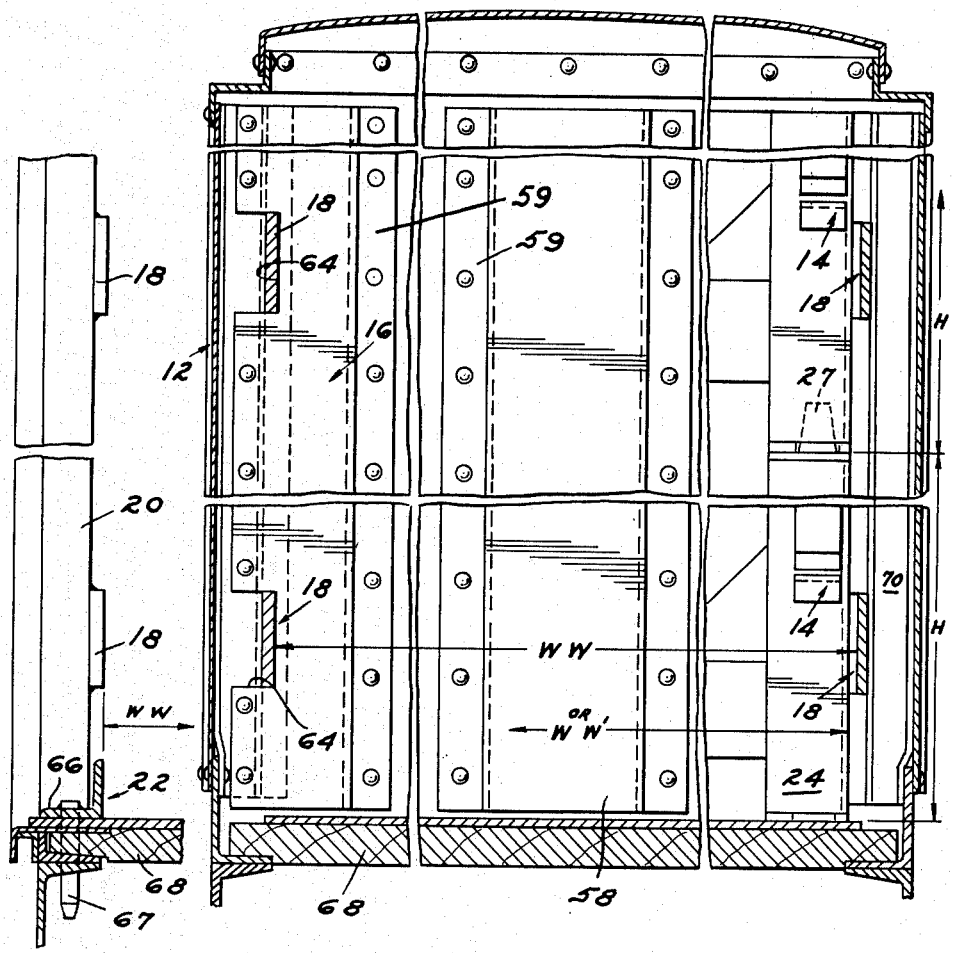

FIGS. 5 and 6 are, respectively, side and end elevational views corresponding to FIGS. 3 and 4, but showing an alternative rack of greater height than that of FIGS. 3 and 4, as dictated by the dimension of the load to be supported, such increased height rack having its bumper strut provisions duplicated at each end for needed stability;

FIG. 7 is a fragmentary view in end elevation, partially broken away, illustrating in larger scale features of a resilient shock absorber type of mount for the bumper strut on the rack;

FIG. 8 is a fragmentary view in side elevation of the rack and bumper structure of FIG. 7, as viewed from the left of that figure;

FIGS. 9 and 10 are, respectively, views in vertical section on lines 9—9 and 10—10 of FIG. 7;

FIG. 11 is a fragmentary view, partially broken away, along a line corresponding to line 11—11 of FIG. 2, illustrating structural features and relationships of the rack-carried bumper provisions and the fixed, built-in bumper abutment or bulkhead means at an end of the vehicle, also illustrating means extending longitudinally of the vehicle to assist in guiding the racks in the loading thereof and to limit transverse movement of the racks crosswise of the vehicle in transit;

FIG. 12 is a view in vertical section on a line corresponding to line 12—12 of FIGS. 1 and 2; and FIG. 13 is a fragmentary view in vertical section on line 13—13 of FIGS. 1 and 2.

FIGS. 1 through 7, 11 and 12 of the drawings show certain dimension-indicating lines and reference characters as applied to the improved bumper strut-equipped racks, generally designated 10, of the invention, and to built-in structural features of a freight transit vehicle, generally designated 12, as contemplated under the principles of the present invention. These dimensional relationships will hereinafter be referred to at some length, following a more generalized description of the loading rack structure and the loading arrangements, inasmuch as it is in such dimensional and positional relationships of rack structure to vehicle that a basically important aspect of the invention deals.

First referring to FIGS. 1 and 2 of the drawings, they show the vehicle 12 as loaded throughout its effective interior length with the bumper type racks. Of these, those appearing at the right of FIG. 2 are racks 10 of a predetermined height suitable to receive the load, with these racks stacked one upon the other to occupy a maximum of available pay load space. On the other hand, the racks appearing at the left-hand side of FIG. 2 are of greater height, being therefore designated 10' and of the type illustrated in FIGS. 5 and 6. They accommodate differently dimensioned merchandise loads, hence have multiple bumper provisions as will be described in connection with FIGS. 5 and 6.

It will be noted in FIG. 1 that certain of the racks are of lesser dimension in the direction longitudinal of the vehicle length than others, so as to optionally enable a full complement of racks, in the lengthwise sense, along the entire interior length of vehicle 12, should the longitudinal dimension of the latter not permit the loading of a full complement of racks of equal width longitudinally of the vehicle interior. In any event, the racks 10, 10' are each provided with at least one bumper strut unit, generally designated respectively as 14 or 14', which units extend longitudinally of the vehicle length and transversely across the respective front and rear ends of the racks facing the side walls of the vehicle; it being intended that, when loaded, the bumper strut units 14, 14' of the racks shall be in longitudinally aligned engagement with one another throughout the effective interior length of the vehicle, each aligned series of units 14, 14' thus in effect constituting a relatively rigid sectional column along the effective vehicle length, for a purpose to be described.

The effective vehicle length referred to its established by end bumper abutment or bulkhead members, generally designated 16, at each end of the vehicle. As illustrated in FIGS. 1 and 2, there are two of these abutments 16 at each end, one at each corner of the vehicle interior; and they are secured to structural members of the transport vehicle in the manner hereinafter described in connection with FIGS. 11 and 12. The number and arrangement of the abutments or bulkhead members 16 at each end of the vehicle may, as also appears in FIGS. 11 and 12, vary depending upon the dimension of the racks transversely of the vehicle length.

However, the point to be noted in connection with FIGS. 1 and 2 is that the longitudinal spacing of one pair of abutments 16 at one end of the vehicle from those at the opposite end substantially equals the overall assembled length of the aligned bumper strut units 14, 14' which constitute the sectional columns at front and rear ends of the respective racks 10, 10' referred to above. The longitudinal dimension between abutments 16 is designated B—B of FIGS. 1 and 2. The endwise clearance between abutments 16 and the endmost bumper strut units 14 or 14' is shown exaggerated in FIGS. 1 and 2; for example, in a vehicle having a longitudinal dimension B—B between the installed abutments 16 of, say, 600 inches, the overall endwise clearance referred to, with all racks in endwise engagement of their bumper units with one another, may be as little as 1 inch. It is therefore seen that the bumper-equipped racks 10 or 10' are the sole means for limiting longitudinal impact movement of the racks when a vehicle is in transit, not requiring further rebuilding of the vehicle interior such as is required when the racks are locked against shock movement by engagement with the longitudinal side walls of the vehicle, or when an assembly of the rack is extensively bulkheaded in a space-wasteful way at its ends.

To recapitulate, for a typical loading arrangement of eight of the racks 10 or 10' in the vehicle, all racks being of the same dimension lengthwise of their respective bumper strut units 14, the overall length of each strut unit will be one-eighth that of the length B—B between abutments or bulkhead members 16, this dimension being a multiple of the individual strut unit lengths. On the other hand, if the racks vary in width, as illustrated in FIG. 1, the summation of the individual lengths of their respective bumper strut units 14 will substantially equal the dimension B—B. In each instance, the longitudinal clearance between abutment and strut column is very small indeed. Thus it is seen that the invention affords considerable flexibility in regard to the number and type of racks which may be installed in the standard effective lnegth of the vehicle interior represented by dimension B—B. Furthermore, a standard rack may be employed, verying its overall effective dimension lengthwise of the car by an appropriate selection of bumper strut length.

In accordance with the invention, the vehicle interior has built thereinto further guide provisions to facilitate the placement of the racks in loading. Thus, as illustrated in FIG. 2, longitudinal guide rails 18 are provided, along and between which the racks 10 or 10' may be moved longitudinally of the vehicle into position, and by which the racks are limited in regard to motion transversely of the vehicle. For example, FIG. 2 shows three such longitudinal guide rails 18 for the guidance of racks 10 of lesser height, while the same figure shows two rails 18' sufficing to guide and restrain racks 10' which are of greater height (as illustrated in FIGS. 5 and 6). There is also provided, across the width of the usual loading door opening 20 a removable rack guide and restraining member, generally designated 22. Further description of the bumper abutment and rack guide and confining provisions will appear in the discussion of FIGS. 11, 12 and 13.

Reference should now be made to FIGS. 3 and 4 of the drawings, showing generally features of construction of the bumper-equipped rack 10, in conjunction with FIGS. 7 through 10 depicting such features in greater detail. The rack comprises four corner uprights 24 of rugged angle iron cross section, the flanges of the respective front and rear legs facing toward one another. Each upright has top and bottom horizontal closure flanges 25, 26, respectively, one equipped with an upstanding locating and registering dowel 27 and the other equipped with an opening to be received on the dowel of a rack therebeneath, for the vertically stacked loading of the racks as illustrated in FIG. 2 of the drawings. The uprights 24 are rigidly braced by longitudinal and transverse beam members 28, 29, respectively, welded or otherwise secured thereto, thus to provide a very rigid and rugged rack structure to support loads of various types.

As indicated above, the embodiment of FIGS. 5 and 6 differs solely from that of FIGS. 3 and 4 in that it is a modified adaptation to receive merchandise loads of greater height than can be handled by stacked racks of the sort shown in FIGS. 3 and 4. Accordingly, the racks 10' of this modified embodiment are equipped with plural bumper strut units 14', each individually identical to the unit 14 of FIGS. 3 and 4, but in proper vertical spacing to one another on the respective uprights 24' of the rack to provide necessary stability. All components and relationships featured in the rack of FIGS. 5 and 6 and corresponding with components and relationships appearing in FIGS. 3 and 4 are designated by corresponding reference numerals, primed, and further specific discussion thereof will be dispensed with.

Note should be taken of certain dimensional indications in FIGS. 3 and 4 and FIGS. 5 and 6. Thus, the dimension W designates the width of the rack in the direction crosswise of the vehicle, for a full width rack substantially equaling the vehicle dimension in this respect; while the dimension W' designates the corresponding dimension of a rack which is of but incremental width crosswise of the vehicle, a pair of racks being arranged end-to-end in this sense, and the crosswise width of the vehicle being a trifle greater than a multiple of the sum of the dimensions W' of the two racks. The dimension D represents the depth of the rack proper 10, exclusive of its bumper strut units 14, in the storage space, i.e., in the direction longitudinally of the vehicle; while the dimension L represents the corresponding overall dimension of the rack, including its bumper strut units.

Referring particularly to FIG. 4, the dimension $h$ indicates the height of the center line of the bumper strut unit 14 above the vehicle floor.

Referring to the embodiment of FIGS. 5 and 6, to a rack structure of greater height, the dimension $h'$ designates a height of one bumper strut unit, roughly approximating that of the unit of FIGS. 3 and 4; while the dimension $h''$ indicates the vertical spacing of the uppermost bumper strut unit 14' above the lowermost.

As best shown in FIGS. 7 through 10, the bumper strut unit 14, in a preferred embodiment thereof, comprises an elongated strut bar 30 in the form of a length of I-beam section turned 90° on its side and guided for sliding movement relative to the rack structure, per se, by provisions on the latter to be described. At the opposite ends thereof, each strut bar 30 has welded thereto a bumper member 31 which, as shown in FIG. 7, is of a mildly angled C-shape in end outline. Its width may approximate the dimension of strut bar 30 across the upright flanges of the latter, and the bumper member 31 thus presents upper and lower portions 32, 33 respectively angled inwardly upwardly and inwardly downwardly relative to the adjacent rack upright 24.

In order to guide the strut bar 30 in the relative longitudinal sliding action of the rack and bar, each upright 24 is provided with a rectangular opening 35 in the flange 36 thereof defining a side of that upright, as shown best in FIG. 9; and each such flange has a pair of rugged guide plates 37 welded to its outer surface to inwardly overlap the top and bottom margins of the opening 35. Guide plates 37 are shaped to mate within the outline of the I-section cross bar 30, with only sufficient lateral clearance between the latter and the opening 35 and guide plates 37 to permit free endwise movement of the strut bar 30 of the bumper strut unit 14 relative to the rack 10 and its uprights 24.

A limiting stop block 39 is welded to one of the flanges 40 of the strut bar 30 adjacent its opposite ends, and between the bumper member 31 and the guide plate 37, as shown in FIGS. 7, 8 and 9, for a purpose to be described. Likewise, the upright flange 36 by which the strut bar 30 is guided has welded thereto, directly above and below the guide plates 37, a pair of cam guide members 41, 42, respectively, of angled outline which are in vertical alignment with the bumper member 30 of the strut bar. It is the function of these fixed cam guide members to guide the bumper strut unit 14 of a rack being placed in position, involving a downward sliding motion of the bumper member 33 of that unit, as shown in FIG. 7, when the bumper member 33 is endwise abutted against a rack previously placed in position. Thus, the upper cam guide 41 is seen to be engaged by member 33 to cam the latter and its associated strut bar and rack structure outwardly through the dot-dash line position as the downward motion proceeds, with the result that the rack comes to position with its bumper strut unit 14 longitudinally aligned in endwise engagement with that of the rack previously loaded. Similarly, the lower cam guide member 42 of the rack being loaded will simultaneously ride downwardly over the bumper 31 of the loaded rack, insuring against any possibility of adjacent bumpers hanging up on one another, and thereby greatly facilitating and expediting the loading procedure.

By preference, the bumper strut unit 14 is equipped with resilient shock absorber provisions, generally designated 44, to cushion the motion of the strut bar 30 in loading, and to cushion motion of the rack structure, per se, relative to its component strut unit after loading, and under shock in transit. A preferred shock absorber structure 44 is illustrated, being shown as a resilient disk type acting under compression; however, it is to be understood that other types of shock absorber devices, for example a rubber cushion type acting in shear rather than in compression, a mechanical compression or tension spring type or the like may be employed. Indeed, it is within the broadest contemplation of the invention that resilient cushioning means need not be employed at all, and in particular at the connection between rack structure, per se, and its bumper strut unit.

In order to mount the resilient shock absorber device 44, backing plates 46 are welded at 47 to the inner surfaces of the flanges 40 of strut bar 30, as shown in FIG. 10. These plates 46 are of the generally triangular outline appearing in FIG. 7. As a further fixed support for shock absorber 44 as well as to house the latter in part, the rack uprights 24 have welded thereto a cross beam 49 of channel-shaped section vertically and laterally enclosing in part the strut bar 30 and shock absorber; and the bottom flange of this beam has welded thereto a pair of laterally spaced upright abutment plates 50, as best shown in FIG. 10. These are of a generally triangular outline shown in FIG. 7. A pair of longitudinally spaced C-shaped members 51 are welded to and between the respective plates 50, the members 51 receiving and piloting the ends of a cushion disk assembly of the shock absorber device 44, furnishing a fixed support for the latter on the cross member 49 attached to frame uprights 24.

The disk assembly referred to comprises opposed circular metallic end disks 53 of substantial thickness, a plurality of axially compressible or distortable rubber disks 54 between disks 53, and a plurality of thinner circular metal disks 55 separating cushion disks 54 from one another. This assembly is provided with a central, coaxial shaft or stem 56 projecting from opposite ends thereof, the ends of member 56 being piloted in the C-shaped members 51 between the upright plates 50, as shown in FIGS. 7 and 10. The assembly 44 is positioned under precompression between the fixed abutment plates 50, and the plates 46 rigidly secured to and depending from strut bar 35 engage opposite outer surfaces of the end disks 53, as depicted in FIG. 7. As thus installed, and with the rack bumper strut units 14 aligned in column fashion along the entire effective length of the vehicle interior, the individual racks, per se, are mounted by the respective shock absorbers 44 at front and rear thereof for individual cushioned floating motion in either direction longitudinally of the unit 14, as the latter is fixedly sustained in the column arrangement. Thus shock is effectively absorbed at each rack component, yet transmitted at the ends of the longitudinal assembly of racks to the vehicle structure.

Provisions are made, as shown in FIGS. 7, 8 and 9, to protect the shock absorber device 44 from failure by limiting the movement of the loaded rack proper relative to the bumper strut unit 14 within the limits of a safe working load on the shock absorber and a desired limited movement of its parts. Thus, as best indicated in FIG. 7, in which the dimension characters D and L respectively designate the longitudinal dimension of the rack proper and the length of its bumper strut unit 14, the dimension character $a$ shows a desired preset limit of relative movement of the strut unit and rack in either direction from a preset neutral position of the parts, as installed with shock absorber device precompressed; and the inner edge of the stop block 39 welded on a strut bar flange 40 is thus located the distance $a$ from the flange 36 of rack upright 24, against which flange it will abut to limit endwise movement of the bumper strut assembly 14 in the manner indicated above.

The dimension $b$ represents the effective entrance dimension or lead of the strut bumper member 31 in the longitudinal direction, and the dimension $c$ is the distance from the outer face of member 31 to the nearest part of the rack structure, i.e., the outer surface of the guide plates 37. In accordance with the invention, the dimension $c$ must be equal to or greater than the sum of dimensions $a$ and $b$ to enable stop block 39 to limit the strut motion properly by first engaging the upright flange 36.

Shock absorber type bumper provisions of the sort described above are employed by preference; however, as previously indicated, various other types of cushioning device may be employed, such as rubber or like material acting in shear, coil springs acting in tension or compression, hydraulic cylinder means, torsion bar means and the like properly mounted in relation to the bumper strut unit 14 and rack proper. Likewise, such shock absorber provisions can be employed in multiple or in various combinations to provide the required cushioning action dictated by the nature of the merchandise carried by the rack.

Now referring to FIGS. 11, 12 and 13 of the drawings, in conjunction with FIGS. 1 and 2, the dimension W—W represents the distance crosswise of the vehicle between the guide rails 18, and the dimensions W and W' are as indicated above, i.e., the former being the overall length in that direction of a single rack 10 adapted to be loaded in a vehicle and the latter indicating the individual corresponding lengths of racks of dimension incremental of the dimension W, a plurality representing in dimension a multiple of the individual dimension occupying, as loaded, the dimension W, as shown in FIG. 11. The clearance space between rack ends and the side walls, represented by the difference between dimension W—W and dimension W, or between W—W and the summation of dimensions W′, is small, enabling the racks to be slid into place longitudinally of the vehicle interior, with their respective bumper strut units 14 engaging in longitudinal alignment to constitute the overall longitudinal sectional column referred to above.

In the case of a vehicle loading in which two or more rack units 10 are arranged crosswise of the vehicle, as depicted in FIG. 11, it is necessary to provide an additional auxiliary bumper abutment or bulkhead element at each of the ends of the vehicle, such auxiliary element being designated 58 in FIGS. 11 and 12. It is of a depth to bring its inner surface in transverse alignment with those of the corner abutment members 16, and of a width sufficient, as positioned in the longitudinal zone of adjacent bumper strut units 14 of transversely engaged racks 10, to provide ample abutment surface for engagement by the bumper members 31 of those units, as shown in FIG. 11. Abutment members 16, 58 are of angular cross section, provided with aligned, laterally projecting flanges 59, at which they are welded to a transverse structural beam, wall or like member 60 of a vehicle 12. In the case of the corner abutment or bulkhead members 16, they are welded at 61 to an adaptor angle 62 secured to the vehicle structure.

As best illustrated in FIG. 13, the corner abutment members 16 are provided with vertically spaced rectangular recesses 64 on the outer edges thereof to receive the side rails 18, thus bracing the latter in the vertical sense; and rail members 18 are at their ends welded to the angle members 62.

To complete the installation, the vehicle is provided across each of its loading openings 20 with the removable guide and restraining plate 22. This is in the form of an angle iron of length approximating that of the opening 20, with its upright flange facing inwardly. Its horizontal floor flange 66 has a plurality of longitudinally spaced pins 67 welded or otherwise fixedly secured thereto to depend therefrom; and these pins are removably received in a series of longitudinally spaced apertures in the vehicle floor 68.

Thus, the longitudinal rails 18 serve to facilitate loading by guiding the racks into place longitudinally, without requiring any particular care in the locating of the latter other than to assure that all bumper strut rack units 14 or 14′ are in longitudinal engagement with one another, and that the series thereof is in engagement with the fixed bumper abutment members 16, 58 at opposite ends of the vehicle. Rails 18, in conjunction with removable member 22, also limit transverse shock movement of the racks, the effect of which is by no means as severe as in the direction longitudinally of the vehicle.

As indicated above, only the corner fixed abutment members 16 are employed when racks having the dimension W (FIG. 11) are loaded, whereas when racks of the incremental dimension W′ are loaded, an additional abutment member or members 58 are employed to supplement members 16.

The dimension B—B (FIGS. 1, 2 and 11) is predetermined at the installation of members 16, 58 in relation to the nature of the racks 10 to be loaded. It is substantially, or only very slightly in excess of, a multiple or some of the overall dimension L of the bumper and rack structure. The removable floor guides 22 are spaced from one another by the dimension W—W, like the guide rails 18, as appears in FIG. 11. They are removed to permit loading through the side wall openings by auxiliary equipment such as a fork lift truck, and are placed in the position shown when the vehicle is loaded. It is to be understood that the usual wood or other lining of the vehicle interior is removed prior to the installation of the guide rail and end abutment means described, the rails 18, 18′ being welded to angle members.

The invention affords a vehicle loading arrangement of great simplicity and little production cost, both in regard to the construction of the bumper-equipped racks 10 or 10′ and the simple provisions necessary to adapt an existing transport vehicle to the use of such racks. The need for expensive side wall-attached provisions to restrain the racks under impact is eliminated, as are the time-consuming operations involved in loading the racks by interengaging the same with such side wall means. Expensive and space-consuming bulkheading of the vehicle, as in the past, is also eliminated. Yet the bumpered racks float longitudinally a limited degree in transit, automatically maintain themselves in position, the bumpers receiving and transmitting impact shocks to the vehicle structure without undesirable destructive shock action on the individual racks.

What I claim as my invention is:

1. The combination with a transport vehicle providing a loading space having abutment members at opposite ends thereof, of loading equipment for said space, comprising a plurality of load supporting racks arranged in succession in said space in a direction longitudinally thereof and between said abutment members, said racks having longitudinal cushioned bumper units, each of which extends in said direction across the full dimension of its respective rack and projects at the opposite ends thereof beyond said rack, the bumper units of successive racks being in longitudinally aligned end-to-end engagement with one another along the length of the succession, so as to act cooperatively as a relatively rigid bumper column, said column being engageable at its opposite ends with said respective abutment members to limit longitudinal cumulative shock movement of the succession of racks in said space by isolating individual movement of the racks, and means connecting the bumper units to the respective racks for movement of each rack in said direction relative to its bumper unit, said connecting means including shock absorbing means between the ends of each bumper unit operatively connecting the latter to its rack to cushion the rack for floating movement in said longitudinal direction both relative to said bumper unit and said column and relative to other racks of said succession of racks.

2. The combination with a transport vehicle providing a loading space having abutment members at opposite ends thereof, of loading equipment for said space, comprising a plurality of load supporting racks arranged in succession in said space in a direction longitudinally thereof and between said abutment members, said racks having longitudinal cushioned bumper units each of which extends in said direction across the full dimension of its respective rack and projects at the opposite ends thereof beyond said rack, the bumper units of successive racks being in longitudinally aligned end-to-end engagement with one another along the length of the succession, so as to act cooperatively as a relatively rigid bumper column, said column being engageable at its opposite ends with said respective abutment members to limit longitudinal cumulative shock movement of the succession of racks in said space by isolating individual movement of the racks, means connecting the bumper units to the respective racks for movement of each rack in said direction relative to its bumper unit, said connecting means including shock absorbing means for each bumper unit operatively connecting the latter to its rack to cushion the rack for floating movement in said longitudinal direction both relative to said bumper unit and said column and relative to other racks of said succession of racks, and means to limit said individual movement of each rack relative to its bumper unit, hence relative to said column.

3. A portable load bearing rack structure for a transport vehicle, comprising a load supporting rack adapted to be disposed in side-to-side aligned longitudinal succession with other similar racks in a vehicle load space, an elongated bumper strut unit extending longitudinally through the rack and supported by the latter for limited longitudinal side-to-side movement relative to the rack, opposite ends of said bumper strut unit projecting longitudinally outwardly of the sides of the rack, means on said rack guiding said strut unit for said relative movement, and a shock absorber device connecting said strut unit to the rack to cushion longitudinal shock incident to said movement, said rack having fixed members adjacent and in vertical alignment with and respectively above and below the respective ends of said bumper strut unit to guide said rack for placement from above in end-to-end aligned contact of its strut unit with that of a successive similar, aligned rack, in the loading of said vehicle space, an end of the bumper strut unit of the guided rack sliding downwardly over the upper guide member of said successive rack in making said placement.

4. A portable load bearing rack structure for a transport vehicle, comprising a load supporting rack adapted to be disposed in side-to-side aligned longitudinal succession with other similar racks in a vehicle load space, said rack having uprights spaced longitudinally of the rack from one another, an elongated bumper strut unit extending longitudinally of the rack and supported by said uprights for limited longitudinal side-to-side movement relative to the rack, opposite ends of said bumper strut unit projecting longitudinally outwardly of the sides of the rack, means on said rack uprights guiding said strut unit for said relative movement, a shock absorber device connecting said strut unit to the rack to cushion longitudinal shock incident to said movement, and means to positively limit the exentet of said relative movement in either longitudinal direction, said uprights having fixed members adjacent and in vertical alignment with and respectively above and below the respective ends of said bumper strut unit to guide said rack for placement from above in end-to-end aligned contact of its strut unit with that of a successive similar, aligned rack, in the loading of said vehicle space, an end of the bumper strut unit of the guided rack sliding downwardly over the upper guide member of said successive rack in making said placement.

5. A portable load bearing rack structure for a transport vehicle, comprising a load supporting rack adapted to be disposed in side-to-side aligned longitudinal succession with other similar racks in a vehicle load space, said rack having uprights spaced longitudinally of the rack from one another, an elongated bumper strut unit extending longitudinally of the rack and supported by said uprights for limited longitudinal side-to-side movement relative to the rack, opposite ends of said bumper strut unit projecting longitudinally outwardly of the sides of the rack, means on said rack uprights guiding said strut unit for said relative movement and confining the strut unit transversely in said movement, said bumper strut unit being of flanged cross-sectional outline and said strut unit guiding means comprising plates fixed on the respective rack uprights and externally following the strut unit outline with limited clearance to so confine the strut unit transversely, a shock absorber device connecting said strut unit to the rack to cushion longitudinal shock incident to said movement, and means to positively limit the extent of said relative movement in either longitudinal direction, said uprights having fixed members adjacent and in vertical alignment with and respectively above and below the respective ends of said bumper strut unit to guide said rack for placement from above in end-to-end aligned contact of its strut unit with that of a successive similar, aligned rack, in the loading of said vehicle space, an end of the bumper strut unit of the guided rack sliding downwardly over the upper guide member of said successive rack in making said placement.

References Cited in the file of this patent
UNITED STATES PATENTS

| | | |
|---|---|---|
| 1,081,853 | Miller | Dec. 16, 1913 |
| 1,675,562 | Kellett | July 3, 1928 |
| 2,047,955 | Fitch | July 21, 1936 |
| 2,623,759 | Forbas | Dec. 30, 1952 |
| 2,965,246 | Guins | Dec. 20, 1960 |
| 2,988,018 | Stough | June 13, 1961 |